July 24, 1962  F. D. HALL  3,045,931
FIRE PROTECTIVE WATER CURTAIN PROJECTOR
Filed March 14, 1961  2 Sheets-Sheet 1

Forest D. Hall
INVENTOR.

BY *Clarence A. O'Brien*
and *Harvey B. Jacobson*
Attorneys

July 24, 1962  F. D. HALL  3,045,931
FIRE PROTECTIVE WATER CURTAIN PROJECTOR
Filed March 14, 1961  2 Sheets-Sheet 2

Forest D. Hall
INVENTOR.

United States Patent Office 3,045,931
Patented July 24, 1962

3,045,931
FIRE PROTECTIVE WATER CURTAIN PROJECTOR
Forest D. Hall, 400 N. Clinton St., Defiance, Ohio
Filed Mar. 14, 1961, Ser. No. 95,576
11 Claims. (Cl. 239—598)

This invention comprises a novel and useful fire-protective water curtain projector and more particularly relates to an attachment for connection to the end of hoses and the like for producing a spray of water in the form of a curtain which is effective for fire fighting and other purposes.

The principal purpose of this invention is to provide a spray nozzle attachment for water hoses which shall be capable of discharging water in the form of a curtain or shield and with the water thus discharged constituting a curtain lying in a plane which is at a predetermined angle with respect to the ground and with respect to the hose by which the water is supplied.

A further object of the invention is to provide a device of relatively simple construction and which shall effectively direct the water discharged from the hose to which the device is attached in the form of a curtain or sheath of a predetermined width and in a semicircular sheet extending through 180 degrees from the ground at one side of the device to the ground at the other side thereof.

Yet another object of the invention is to provide a device in accordance with the preceding object which shall be of relatively simple construction, and yet shall uniformly distribute the water throughout an extent of 180 degrees to maintain a substantially uniform density of water in the spray or curtain produced by the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

In the accompanying drawings, the numeral 10 designates generally the protective water curtain projector in accordance with this invention which is shown as being detachably mounted upon the end of a hose 12 such as a fire hose. When so applied, the device is adapted to form a transversely extending vertical water curtain 14 extending for 180 degrees vertically from the ground on opposite sides of the hose and providing a curtain or shield which serves as a protection for fire fighters or other persons rearwardly of the curtain when the latter confronts a fire or the like.

Figure 2:
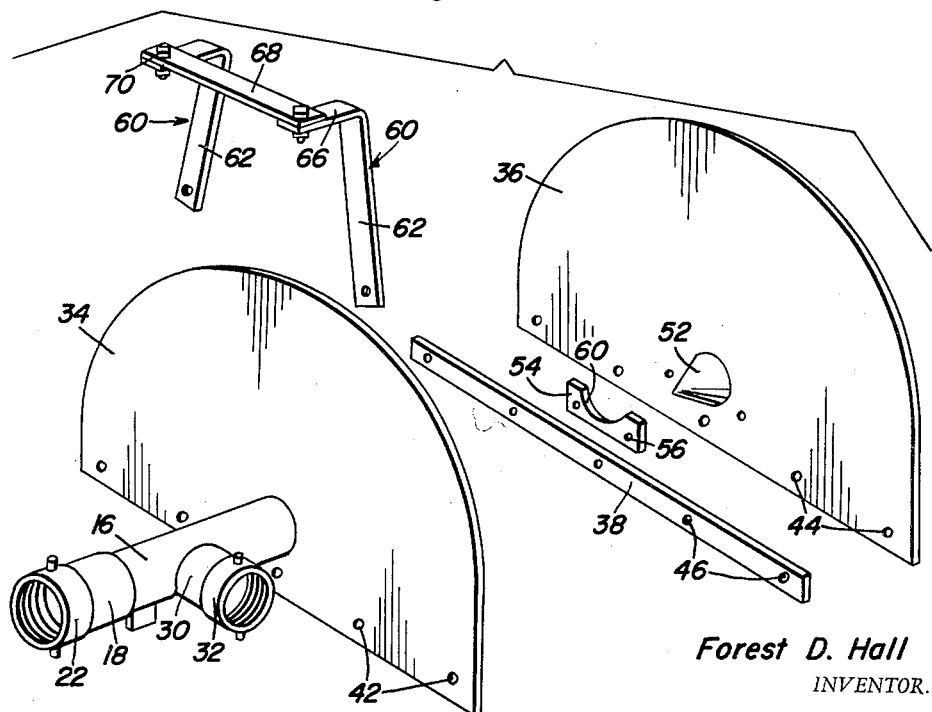
FIGURE 2 is an exploded prospective view of the components of the spray attachment.
Figure 3:
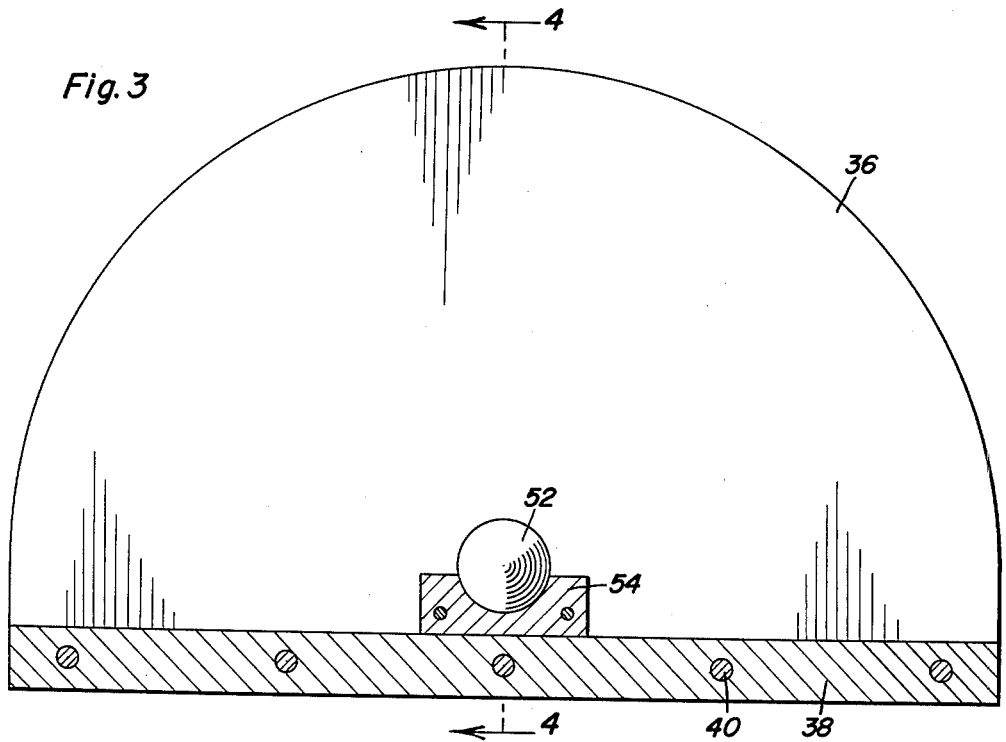
FIGURE 3 is a view in vertical transverse section through the device.
Figure 4:
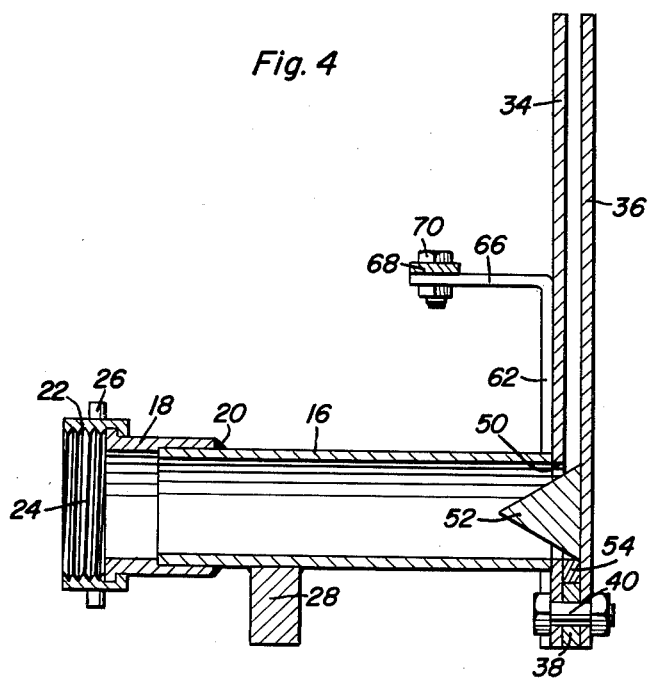
FIGURE 4 is a view in vertical longitudinal section taken substantially upon the plane indicated by the section line 4—4 of FIGURE 3.

The attachment 10, as shown best in FIGURES 2–4, comprises a cylindrical body or pipe section 16 having a coupling sleeve 18 embracing one end of the same and welded thereto as at 20 upon which is retained a coupling gland 22, the latter being internally threaded as at 24 for engagement upon the conventional threads of the hose 12. Lugs 26 projecting from the gland 22 serve to facilitate connection and disconnection of the attachment from the hose in a manner well understood by those skilled in the art.

Projecting downwardly from the underside of the pipe section 16 is a lug 28 which constitutes a leg serving to support the device in stable position upon the ground. Conveniently, from its mid portion, the pipe section 16 may be provided with a branch connector 30 having another coupling sleeve or gland 32 thereon similar to the gland 22 and by means of which a second hose may be coupled to the device when it is desired to increase the amount of water supplied thereto.

Referring now especially to FIGURES 2 and 4 it will be seen that the projector comprises a pair of parallel spaced plates between which the water is discharged and which confines the water to discharge as a curtain or sheet from the peripheries of these plates. Thus, there is provided an inner plate 34 of semicircular configuration which is adapted to be welded or otherwise fixedly secured to the discharge end of the pipe section 16. The lower edge of this plate, as shown in FIGURE 4, is adapted to lie in the same horizontal plane as that of the leg 28 so that the bottom edge of the plate and the leg 20 serve to provide a stable support and foundation for the device upon the ground.

Cooperating with the inner plate 34 is a complementary outer plate 36 which is of the same size. A spacer bar 38 is disposed between and is coterminous with the bottom edges of the two plates 34 and 36, being detachably secured thereto as by means of fastening bolts 40 which extend through registering apertures 42 in the inner plate, 44 in the outer plate and 46 in the spacer. Projecting inwardly from the outer plate 36 toward the inner plate and extending through the opening 50 in the latter which is of the same size as the internal diameter of the pipe section 16, is a conical projection 52 which is disposed centrally of the pipe section 16 and the opening 50, and constitutes a water diffuser member. A further spacer element 54 is apertured as at 56 to be received upon the inner plate 34, and to be retained thereon as by suitable fasteners inserted through complementary apertures in the inner plate. The further spacer plate 54 is provided with an arcuate recess 60 which as shown in FIGURES 3 and 4 partially embraces the diffuser cone 52 and serves to direct most of the incoming water from the hose 12 in an upward direction.

A support handle consisting of a pair of L-shaped brackets 60 each having a vertical leg 62 secured to the forward plate 34 as by fastening bolts 64 is provided upon opposite sides of the pipe section 16, these brackets having horizontal upper legs as at 66. A crossbar 68 comprising a handle member is secured to the upper leg 66 as by fastening bolts 70 so as to provide a means which overlies the pipe section 16 and is spaced from the inner plate 34 to facilitate lifting or positioning the device as necessary.

From the foregoing it is believed that the construction and operation of the device will be readily apparent. By means of the spacer element the desired distance between the two parallel plates is attained. The diffuser member 52 distributes the incoming stream of water from the hose 12 substantially uniformly about a 180 degree extent thereby producing the fire protective curtain or shield 14. This shield extends from the ground on one side of the hose to the ground on the other side thereof, and provides an impenetrable wall which protects the fire fighters in back of the same from the heat of a fire in front of the device. The device may be pushed forward as desired so as to maintain a convenient accessibility of the fire fighters to the conflagration.

As previously mentioned, the device contains provision for connecting a plurality of hoses to increase the strength and water density of the protective water curtain if desired.

Figure 1:
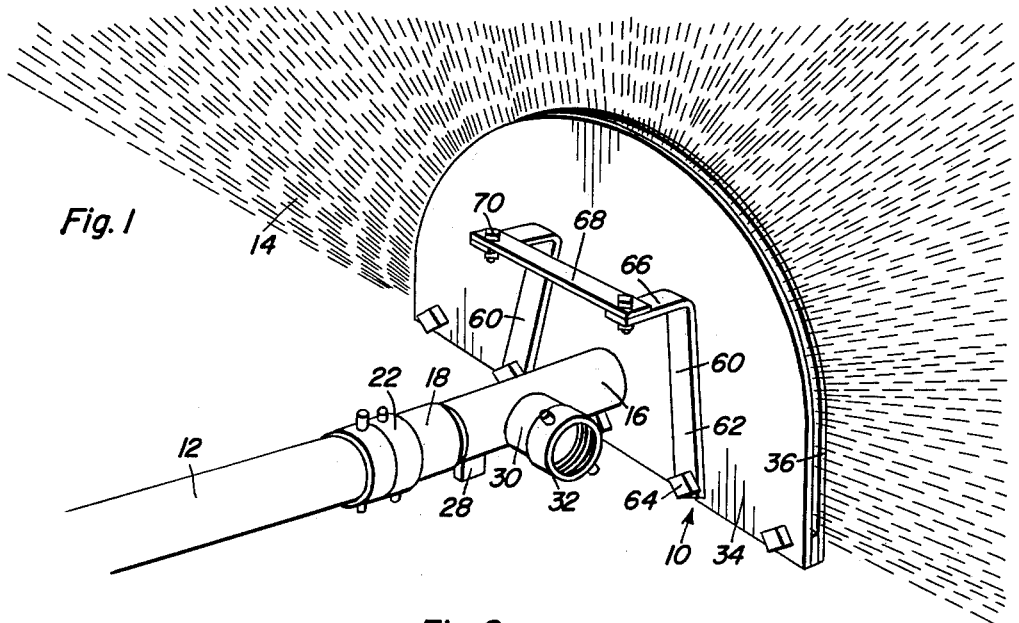
FIGURE 1 is a perspective view showing a preferred construction of the water curtain projector in accordance with this invention attached to the end of a hose and in operative position thereon.

In the arrangement shown in FIGURE 1 the water curtain is perpendicular to the hose 12. However, by capping the fitting 22 instead of the fitting 32 and by connecting the hose 12 to the fitting 32, the water curtain may be disposed parallel to the base, thereby adapting the device to provide a protective curtain in narrow spaces, as between closely adjacent buildings and the like.

The solid shield water curtain is also ideally adapted as a dry pipe installation between a filtering device or station and volatile and flammable liquid storage tanks.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fire protective water curtain projector comprising a spray head and means for connecting said spray head to a water supply conduit, said spray head including a pair of parallel spaced plates having an opening between their peripheries for discharging a continuous sheet of water over a circumferential extent of 180 degrees, spacer means interposed between said plates and rigidly connected thereto, said spacer means comprising a strip coterminous with the bottom edges of said plates and coextensive therewith and preventing escape of water from between the bottom edges of said plates.

2. A fire protective water curtain projector comprising a spray head and means for connecting said spray head to a water supply conduit, said spray head including a pair of parallel spaced plates having an opening between their peripheries for discharging a continuous sheet of water over a circumferential extent of 180 degrees, spacer means interposed between said plates and rigidly connected thereto, one of said plates having a water inlet opening therethrough into the space between said plates.

3. A fire protective water curtain projector comprising a spray head and means for connecting said spray head to a water supply conduit, said spray head including a pair of parallel spaced plates having an opening between their peripheries for discharging a continuous sheet of water over a circumferential extent of 180 degrees, spacer means interposed between said plates and rigidly connected thereto, said connecting means comprising a pipe section adapted for attachment to a source of water supply, one of said plates being secured to and embracing said pipe section whereby said head is rigidly secured to and receives water from said pipe section.

4. The combination of claim 3 including a support leg on the underside of said pipe section, the lower edges of said plates and of said leg lying in a common plane for supporting said head.

5. A fire protective water curtain projector comprising a spray head and means for connecting said spray head to a water supply conduit, said spray head including a pair of parallel spaced plates having an opening between their peripheries for discharging a continuous sheet of water over a circumferential extent of 180 degrees, spacer means interposed between said plates and rigidly connected thereto, one of said plates having a water inlet opening therethrough into the space between said plates, the other of said plates having a conical projection extending into said orifice and diffusing water entering the space between said plates from said orifice to the peripheries of said plates.

6. The combination of claim 5 wherein said plates are semi-circular in shape.

7. A fire protective water curtain projector comprising a spray head and means for connecting said spray head to a water supply conduit, said spray head including a pair of parallel spaced plates having an opening between their peripheries for discharging a continuous sheet of water over a circumferential extent of 180 degrees, spacer means interposed between said plates and rigidly connected thereto, a handle secured to one of said plates.

8. A fire protective water curtain projector comprising a pair of semi-circular plates, a spacer disposed between and rigidly connected to said plates as the bottom edge thereof, said plates having arcuate peripheries of 180 degrees in extent from which water is discharged in a continuous curtain, one of said plates having an orifice, a pipe section secured to said one plate and registering with said orifice for discharging water into the space between said plates, fasteners securing the lower edges of said plates to said spacer and extending therethrough.

9. The combination of claim 8 wherein the other of said plates has a conical projection extending into said orifice and constituting a water diffuser.

10. The combination of claim 9 wherein said orifice and diffuser are located at the lower central portion of said plates and above said spacer.

11. The combination of claim 10 including an additional spacer plate secured to said other of said plates and resting upon said spacer and having an upwardly opening semi-circular notch registering with the rim of said orifice and partially surrounding said diffuser and cooperating with said orifice and diffuser to direct water therefrom in a generally upwardly and outwardly direction.

References Cited in the file of this patent

UNITED STATES PATENTS

| | | |
|---|---|---|
| 724,053 | Schroeder | Mar. 31, 1903 |
| 1,186,117 | Moe | June 6, 1916 |
| 1,434,625 | Olsen | Nov. 7, 1922 |
| 1,599,411 | Gilsenan | Sept. 14, 1926 |
| 2,588,312 | Walker | Mar. 4, 1952 |
| 2,814,471 | Carr et al. | Nov. 26, 1957 |